United States Patent
Ishihara (10) Patent No.: US 9,280,707 B2
(45) Date of Patent: Mar. 8, 2016

(54) DETECTION APPARATUS FOR DETECTING MOVEMENT OF OBJECT, DETECTION METHOD AND STORAGE MEDIUM

(71) Applicant: CASIO COMPUTER CO., LTD., Shibuya-ku, Tokyo (JP)

(72) Inventor: Masanori Ishihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/663,407

(22) Filed: Mar. 19, 2015

(65) Prior Publication Data
US 2015/0339529 A1 Nov. 26, 2015

(30) Foreign Application Priority Data
May 21, 2014 (JP) .................. 2014-105383

(51) Int. Cl.
*G06K 9/00* (2006.01)
*G06T 7/20* (2006.01)

(52) U.S. Cl.
CPC .............. *G06K 9/00624* (2013.01); *G06T 7/20* (2013.01); *G06T 2207/10016* (2013.01); *G06T 2207/10024* (2013.01); *G06T 2207/10052* (2013.01)

(58) Field of Classification Search
None
See application file for complete search history.

(56) References Cited

U.S. PATENT DOCUMENTS 6,125,145 A   9/2000   Koyanagi et al.

FOREIGN PATENT DOCUMENTS

| JP | 05007371 A | 1/1993 |
|----|------------|--------|
| JP | 05007372 A | 1/1993 |
| JP | 05191829 A | 7/1993 |
| JP | 09186988 A | 7/1997 |
| JP | 11215519 A | 8/1999 |
| JP | 2007102556 A | 4/2007 |

OTHER PUBLICATIONS

Japanese Office Action (and English translation thereof) dated Jun. 23, 2015, issued in counterpart Japanese Application No. 2014-105383.

*Primary Examiner* — Atiba O Fitzpatrick
(74) *Attorney, Agent, or Firm* — Holtz, Holtz & Volek PC (57) ABSTRACT

The average value calculation section acquires luminance information and color information, from captured images continuously captured in frame as a unit by an image capture unit. The detection method determination section determines either one or both among the luminance information and color information to use in order to detect movement of the predetermined object, based on the luminance information and color information acquired. The motion detection section detects movement of the predetermined object using either one or both among the luminance information and color information based on the result determined.

10 Claims, 7 Drawing Sheets

DETECTION APPARATUS FOR DETECTING MOVEMENT OF OBJECT, DETECTION METHOD AND STORAGE MEDIUM

This application is based on and claims the benefit of priority from Japanese Patent Application No. 2014-105383, filed on 21 May 2014, the content of which is incorporated herein by reference.

BACKGROUND OF THE INVENTION

1. Field of the Invention

The present invention relates to a detection apparatus, a detection method and a storage medium.

2. Related Art

Conventionally, technology employing luminance information of captured images has been widely used in order to detection movement of an object from captured images. However, there are cases of misrecognizing by only employing the luminance information of the captured image, and in order to prevent misrecognition and raise accuracy, technology for detecting based on both the change in luminance and the change in hue has been disclosed, as in the technology described in Japanese Unexamined Patent Application, Publication No. H9-186988.

SUMMARY OF THE INVENTION

According to a first aspect of the present invention, a detection apparatus for detecting movement of a predetermined object from captured images includes:
  an acquisition section that acquires luminance information and color information, from the captured images continuously captured in frame as a unit by an image capture section; a determination section that determines whether to use either one or both among the luminance information and the color information in order to detect movement of the predetermined object, based on the luminance information and the color information acquired; and a detection section that detects movement of the predetermined object using either one or both among the luminance information and the color information, based on a result of determination.

According to a second aspect of the present invention, a detection apparatus for detecting movement of a predetermined object from captured images includes:
  an acquisition section that acquires luminance information, from the captured images continuously captured in frame as a unit by an image capture section; a detection threshold setting section that sets a detection luminance threshold related to the luminance information; a detection section that detects movement of the predetermined object using the detection luminance threshold that was set and the luminance information that is acquired; and a reset control section that causes reset of the detection luminance threshold to be executed in the detection threshold setting section, in a case of satisfying a predetermined condition.

According to a third aspect of the present invention, a detection method to be executed by a detection apparatus for detecting movement of a predetermined object from captured images includes the steps of:
  acquiring luminance information and color information, from the captured images continuously captured in frame as a unit by an image capture section; determining whether to use either one or both among the luminance information and the color information in order to detect movement of the predetermined object, based on the luminance information and the color information acquired; and detecting movement of the predetermined object using either one or both among the luminance information and the color information, based on results determined.

According to a fourth aspect of the present invention, a detection method to be executed by a detection apparatus for detecting movement of a predetermined object from captured images includes the steps of:
  acquiring luminance information from the captured images continuously captured in frame as a unit by an image capture section; setting a detection luminance threshold related to the luminance information; detecting movement of the predetermined object using the detection luminance threshold that was set and the luminance information that is acquired; and executing reset of the detection luminance threshold in a case of satisfying a predetermined condition.

According to a fifth aspect of the present invention, a computer readable non-transitory storage medium is encoded with a program for enabling a computer that controls a detection apparatus for detecting movement of a predetermined object from captured images to realize:
  an acquisition function of acquiring luminance information and color information, from the captured images continuously captured in frame as a unit by an image capture section; a determination function of determining whether to use either one or both among the luminance information and the color information in order to detect movement of the predetermined object, based on the luminance information and the color information acquired; and a detection function of detecting movement of the predetermined object using either one or both among the luminance information and the color information, based on results determined.

According to a sixth aspect of the present invention, a computer readable non-transitory storage medium is encoded with a program for enabling a computer that controls a detection apparatus for detecting movement of a predetermined object from captured images to realize:
  an acquisition function of acquiring luminance information from the captured images continuously captured in frame as a unit by an image capture section; a detection threshold setting function of setting a detection luminance threshold related to the luminance information; a detection function of detecting movement of the predetermined object using the detection luminance threshold that was set and the luminance information that is acquired; and a reset control function of executing reset of the detection luminance threshold by way of the detection threshold setting function in a case of satisfying a predetermined condition.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

When the following detailed description is considered together with the drawings below, deeper understanding of the present application is obtainable.

DETAILED DESCRIPTION OF THE INVENTION

Hereinafter, an embodiment of the present invention will be explained using the drawings.

Figure 1:
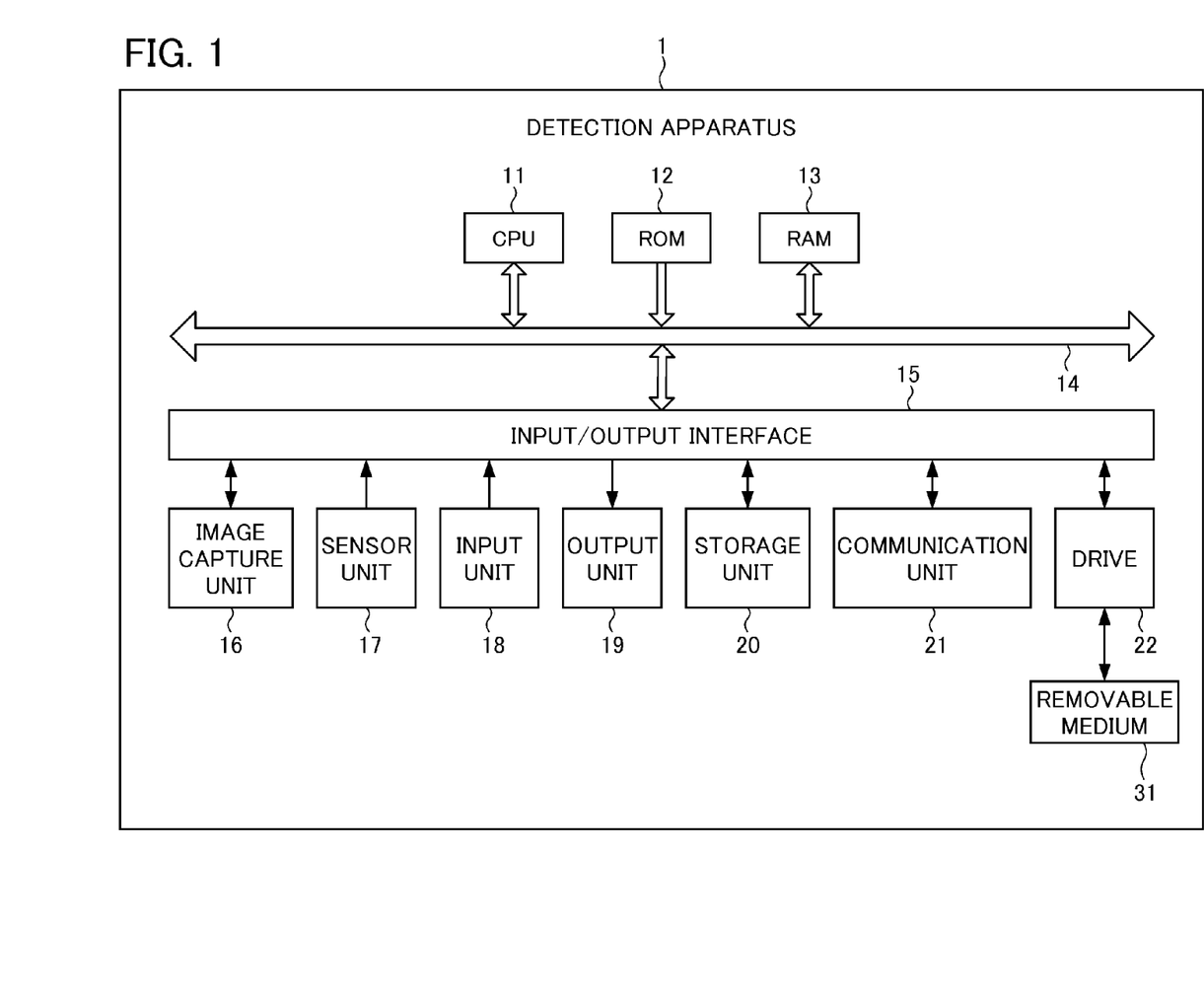
FIG. 1 is a block diagram showing the configuration of hardware of a detection apparatus according to an embodiment of the present invention.

FIG. 1 is a block diagram showing the configuration of hardware of a detection apparatus 1 according to an embodiment of the present invention.

The detection apparatus 1 is configured as a digital camera, for example.

The detection apparatus 1 includes a CPU (Central Processing Unit) 11, ROM (Read Only Memory) 12, RAM (Random Access Memory) 13, a bus 14, an input/output interface 15, an image capture unit 16, a sensor unit 17, an input unit 18, an output unit 19, a storage unit 20, a communication unit 21, and a drive 22.

The CPU 11 executes various processing in accordance with programs recorded in the ROM 12, or programs loaded from the storage unit 20 to the RAM 13.

The data, etc. required upon the CPU 11 executing the various processing is also stored as appropriate in the RAM 13.

The CPU 11, ROM 12 and RAM 13 are connected to each other via the bus 14. The input/output interface 15 is also connected to this bus 14. The image capture unit 16, sensor unit 17, input unit 18, output unit 19, storage unit 20, communication unit 21 and drive 22 are connected to the input/output interface 15.

Although not illustrated, the image capture unit 16 includes an optical lens unit and image sensor.

In order to photograph a subject, the optical lens unit is configured by lenses condensing light such as a focus lens and zoom lens, for example.

The focus lens is a lens for forming an image of a subject on the light receiving surface of the image sensor. The zoom lens is a lens that allows the focal length to freely change in a certain range.

The optical lens unit also includes peripheral circuits to adjust setting parameters such as focus, exposure and white balance, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device.

The optoelectronic conversion device optoelectronically converts (i.e. captures) the image of the subject, accumulates the resultant image signal for a predetermined time interval, and sequentially supplies the accumulated image signal as an analog signal to the AFE.

The AFE executes a variety of signal processing such as A/D (Analog/Digital) conversion processing on this analog image signal. The variety of signal processing generates a digital signal that is output as an output signal from the image capture unit 16.

Such an output signal of the image capture unit 16 is hereinafter referred to as "captured image". The captured image is acquired as an image for the motion detection described later, a live view image, image for recording, etc., and is supplied to the CPU 11, etc. as appropriate.

The sensor unit 17 measures the relative position and angle of the detection apparatus 1. In the present embodiment, the sensor unit 17 includes various sensors such as a position sensor consisting of a GPS receiver and a three-axis accelerometer.

The input unit 18 is configured by a microphone, various buttons, etc., and inputs sound, information, etc. in response to operations of a user.

The output unit 19 is configured by a display, a speaker, etc., and outputs images and sound.

The storage unit 20 is configured by a hard disk, DRAM (Dynamic Random Access Memory), etc., and stores the data of various images.

The communication unit 21 controls communication performed with another apparatus (not illustrated) via a network including the Internet.

Removable media (removable medium) 31, made from a magnetic disk, optical disk, magneto-optical disk, semiconductor memory or the like, is installed in the drive 22 as appropriate. Programs read from the removable media 31 by the drive 22 are installed in the storage unit 20 as necessary. In addition, the removable media 31 can store various data such as the data of images stored in the storage unit 20 in a similar way to the storage unit 20.

The detection apparatus 1 configured in the above way has a function of performing detection (motion detection) of a moving object (e.g., part of a subject such as a hand) entering into a specific region (detection region) of a captured image, and then automatically depressing the shutter (Hereinafter referred to as "motion shutter function", and the processing to perform photography using the "motion shutter function" is referred to as "motion shutter photography processing".). It should be noted that "moving object" is described only as "object" as appropriate for simplification of the description.

Then, the detection apparatus 1 sets a detection threshold in order to perform motion detection for each of the luminance component and chrominance component of captured images, and performs motion detection using either one or both of these. Furthermore, the detection apparatus 1 sets a determination threshold for each of the luminance component and chrominance component of captured images, in order to determine whether to perform motion detection using either of the detection thresholds of one or both of the luminance component and chrominance component of captured images (mode of motion detection). The detection apparatus 1 performs comparison between the difference in the detection region of consecutive captured images and the determination threshold for the luminance component and chrominance component of captured images, and according to the comparison results thereof, determines whether to perform motion detection using either of the detection thresholds of one or both of the luminance component and chrominance component of captured images (i.e. mode of motion detection). In addition, the detection apparatus 1 sets a reset-threshold for each of the luminance component and chrominance component in the detection region of the captured images. The detection apparatus 1 performs comparison between the average values of each of the luminance component and chrominance component of the entire captured image and the reset-thresholds. Then, the detection apparatus 1 detects whether the photographing environment has greatly changed according to the comparison results thereof, and resets the detection thresholds.

According to the detection apparatus 1 having such a configuration, it becomes possible to detect movement of an object more appropriately in captured images.

It should be noted that, in the present embodiment, as the luminance information of the captured image and color information, an explanation will be made giving an example of a case of performing various processing using the luminance component and chrominance component in YUV color space. However, as the luminance information of the captured image and color information, it is also possible to employ luminance information and color information expressed in various color spaces (e.g., brightness, hue, etc. in HSV color space).

Figure 2:
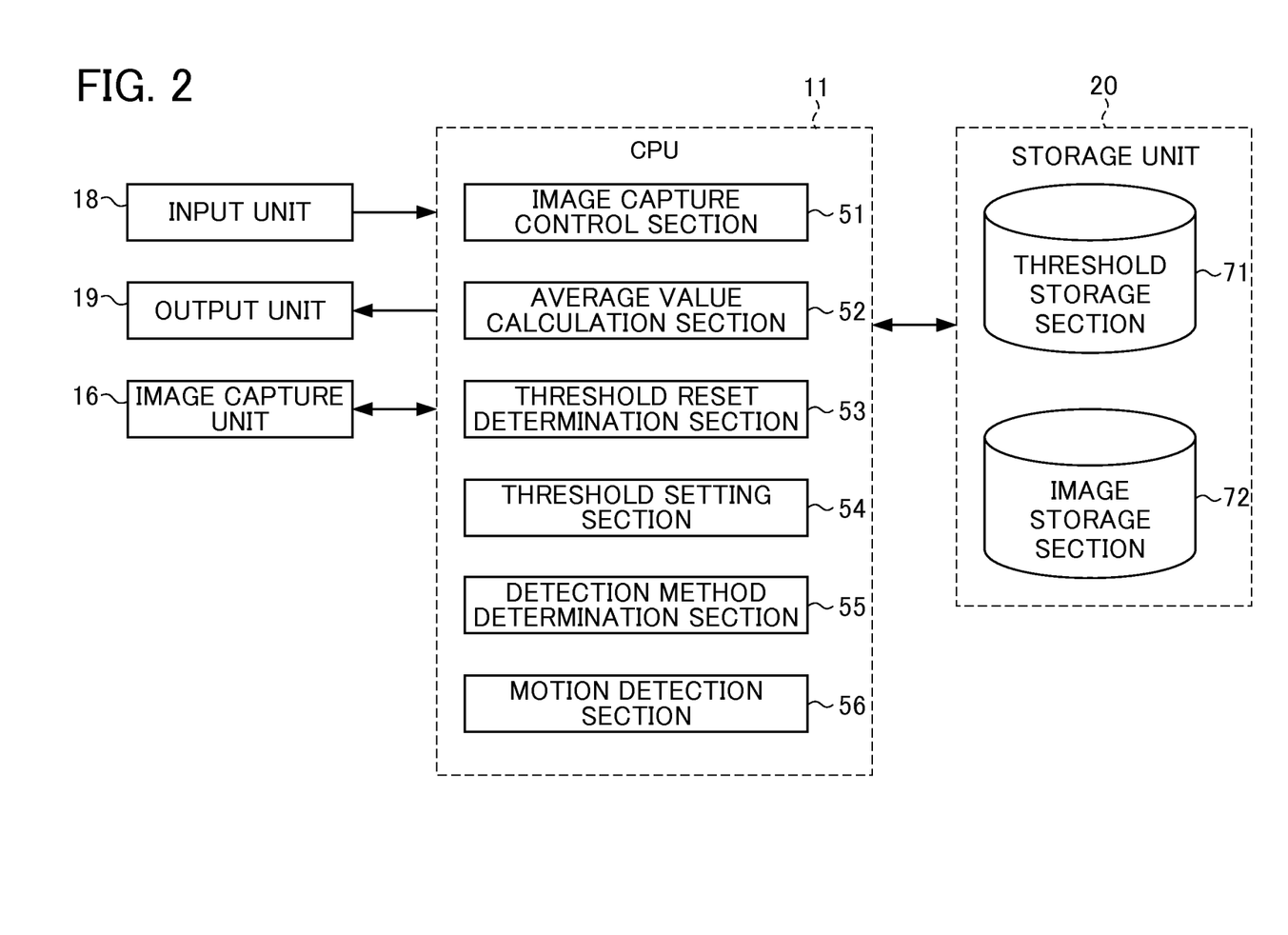
FIG. 2 is a functional block diagram showing the functional configuration for executing motion shutter photography processing, among the functional configurations of the detection apparatus in FIG. 1.

FIG. 2 is a functional block diagram showing the functional configuration for executing motion shutter photography processing, among the functional configurations of such a detection apparatus 1.

Figure 3A:
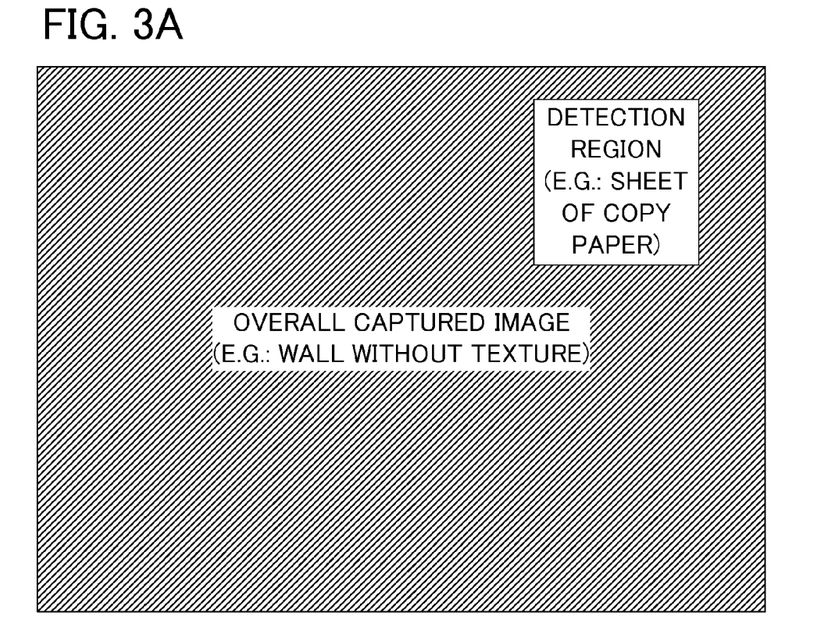
FIG. 3A is a schematic diagram showing a state in which a detection region is set in a captured image, and is a view showing the state in which the difference in luminance component of the detection region is difficult to express.
Figure 3B:
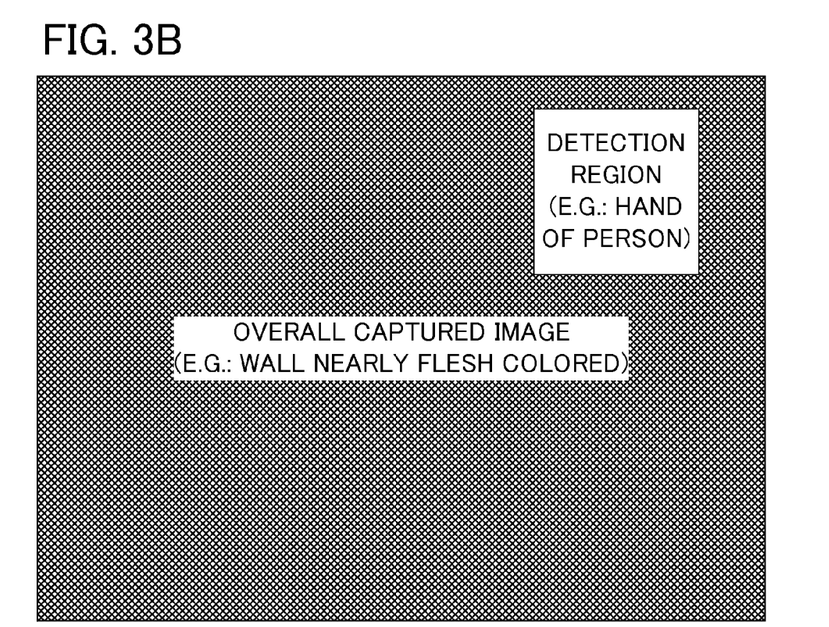
FIG. 3B is a schematic diagram showing a state in which a detection region is set in a captured image, and is a view showing the state in which the difference in chrominance component of the detection region is difficult to express.

In addition, FIG. 3 provides schematic diagrams showing states in which the detection region is set in the captured image, with FIG. 3A being a view showing a state in which the difference in the luminance component of the detection region is difficult to express, and FIG. 3B being a view showing a state in which the difference in chrominance component of the detection region is difficult to express.

Motion shutter photography processing refers to a sequence of processing that performs motion detection using either of the detection thresholds of one or both of the luminance component and chrominance component of the captured images, in response to the comparison results between the difference in the detection region of consecutive captured images and the determination threshold, and then performs photography.

In addition, the motion shutter photography processing includes the variety of processing of threshold setting processing to set the judgment thresholds and detection thresholds of the luminance component and chrominance component from the difference in the detection region of consecutive captured images, detection method judgment processing to judge whether to perform motion detection using either of the detection thresholds of one or both of the luminance component and chrominance component of the captured image, and detection processing to perform motion detection.

Hereinafter, the functional configuration of the detection apparatus 1 will be explained while referencing the schematic diagram of FIG. 3 as appropriate.

In the case of motion shutter photography processing being executed, an image capture control unit 51, average value calculation section 52, threshold reset determination unit 53, threshold setting unit 54, detection method determination section 55 and motion detection section 56 function in the CPU 11, as shown in FIG. 2.

In addition, a threshold storage section 71 and image storage section 72 are formed in one region of the storage unit 20.

The determination thresholds, the detection threshold and the resetting threshold for the luminance component and chrominance component described later are stored in the threshold storage section 71.

In addition, image data of a number of recent captured images set in advance, captured images for recording, etc. are stored in the image storage section 72.

The image capture control unit 51 performs control of photography by the detection apparatus 1. More specifically, the image capture control unit 51 performs control such as to acquire captured images for recording in the image capture unit 16, in the case of depression of the shutter being carried out automatically or manually according to the motion shutter function or operation of the shutter button. The data of captured images acquired according to the control of the image capture control unit 51 is stored in the image storage section 72.

In addition, the image capture control unit 51 acquires captured images continuously outputted from the image capture unit 16 in frame as a unit, and sequentially displays on the display of the output unit 19 as a live view image.

The average value calculation section 52 calculates the average values of the luminance component and chrominance component for pixels of the overall captured image and within the detection region (refer to FIG. 3). The average values for the luminance component and chrominance component of pixels within the detection region are used in the setting of the detection threshold and determination threshold, motion detection within the detection region, and determination of the mode of motion detection. On the other hand, the average values for the luminance component and chrominance component of the overall captured image are used for detecting that the photographing environment has greatly changed. It should be noted that, in the present embodiment, although it is configured to use the average values of pixels of the overall captured image or within the detection region, so long as being a value serving as an index representing the contents of the image, it may be configured to use the total value of pixels of the overall captured image or within the detection region, for example.

The threshold reset determination unit 53 compares between the average values of the luminance component and chrominance component of pixels of the overall captured image calculated by the average value calculation section 52, and the reset-thresholds set for each of the luminance component and chrominance component. Then, in the case of the average value for either of the luminance component and chrominance component of the overall captured image being greater than the reset-thresholds of the luminance component and chrominance component, respectively, the threshold reset determination unit 53 detects that the photographing environment has greatly changed, and outputs to the threshold setting unit 54 an instruction for resetting the detection threshold (hereinafter referred to as "threshold reset instruction").

The threshold setting unit 54 sets the determination threshold for determining the mode of motion detection, from the difference in the detection region between two consecutive captured images. More specifically, the threshold setting unit 54 acquires the differences in average values of the luminance component and chrominance component, respectively, calculated by the average value calculation section 52, for the respective detection regions of the consecutive captured images. Then, the threshold setting unit 54 sets the determination threshold to a value of a predetermined percentage greater than the acquired average value for each of the luminance component and chrominance component (e.g., 120% of the difference of the acquired average value).

In addition, the threshold setting unit 54 sets the detection threshold for performing motion detection from the difference in the detection region between the two consecutive captured images used in setting of the determination threshold. More specifically, the threshold setting unit 54 sets the detection threshold to a value of a predetermined percentage greater than the difference in acquired average values and greater than the determination threshold (e.g., 150% of the difference in acquired average value) for the respective detection regions of the consecutive captured images used in the setting of determination thresholds, for the luminance component and chrominance component, respectively. However, it may be configured to set absolute values for each of the luminance component and chrominance component, as the determination threshold and detection threshold. For example, in the case of the difference in average values of the detection regions of captured images used in the setting of the determination threshold being expressed in 255 stages, if the difference thereof is 100, it is possible to set the determination threshold as "difference (100)+20" and the detection threshold as "difference (100)+50". It should be noted that the absolute value or predetermined percentage as this detection threshold and determination threshold can be set arbitrarily according to the results of experiments, simulations, or the like.

Furthermore, the threshold setting unit 54 sets the reset-threshold for determining whether resetting of the detection thresholds is necessary, based on the average values of the overall captured images used in the setting of the determination threshold. More specifically, the threshold setting unit 54 sets the reset-thresholds for each of the luminance component and chrominance component, based on the average values of the overall captured image used in the setting of the determination thresholds for each of the luminance component and chrominance component. At this time, the numerical value representing the predetermined percentage (e.g., 30%) is set as the reset-threshold for the average values of each of the luminance component and chrominance component of the two consecutive overall captured images used in setting of the determination threshold or one of these overall captured images. In the case of setting the numerical value of the predetermined percentage as the reset-threshold, the average values of the overall captured images used in the setting of the determination thresholds (average values for luminance component and chrominance component) are stored. Then, upon determining whether resetting of the detection threshold is necessary, it is determined whether the change in the average values (average values of luminance component and chrominance component) for the overall captured image serving as the comparison target are greater than the reset-thresholds. However, it may be configured to set absolute values for each of the luminance component and chrominance component as the reset-thresholds. In this case, for example, if the average value of the overall captured images used in the setting of the determination threshold is 100 out of 255 levels, 130 (100+30) as the upper threshold and 70 (100−30) as the lower threshold will be set as the reset-thresholds. It should be noted that the absolute value or predetermined percentage as these reset-thresholds can be set arbitrarily according to the results of experiments, simulations or the like.

In addition, the threshold setting unit 54 sets new detection thresholds from the difference in detection regions of the two consecutive captured images, in the case of a threshold reset instruction being inputted from the threshold reset determination unit 53. It is thereby possible to update the detection threshold to a more appropriate value, in the case of the photographing environment having greatly changed. It should be noted that it may be configured to reset the determination threshold together with resetting of the detection threshold.

The detection method determination section 55 compares between the determination thresholds set by the threshold setting unit 54 and the differences in luminance component and chrominance component of the consecutive captured images, and then sets the mode of motion detection according to the comparison results. More specifically, the detection method determination section 55 sets to a mode (first detection mode) that performs motion detection of captured images using the detection threshold of the luminance component, in the case of determining that the difference of luminance component in the consecutive captured images is greater than the determination threshold. It thereby becomes possible to more appropriately detect that a moving object has entered the detection region, even in a case of performing motion detection in captured images for which the difference in chrominance component is difficult to express, such as a case of the background being a wall nearly flesh colored, and detecting the hand of a person entering the detection region, as shown in FIG. 3B.

In addition, the detection method determination section 55 sets to a mode (second detection mode) that performs motion detection of captured images using the detection threshold of the chrominance component, in the case of determining that the difference in luminance component between consecutive captured images is no higher than the determination threshold, and that the difference in chrominance component is greater than the determination threshold. It thereby becomes possible to more appropriately detect that a moving object has entered the detection region, even in a case of performing motion detection in captured images for which the difference in luminance component is difficult to express, such as a case of the background being a wall without texture, and detecting a sheet of copy paper entering the detection region, as shown in FIG. 3A.

Furthermore, the detection method determination section 55 sets to a mode (third detection mode) that performs motion detection in captured images using the detection thresholds of both the luminance component and chrominance component, in the case of having determined that neither of the differences of luminance component and chrominance component in the consecutive captured images is higher than the determination thresholds. It thereby becomes possible to more appropriately detect that a moving object has entered the detection region, even in the case of performing motion detection in captured images for which the differences in either of the luminance component and chrominance component are difficult to express clearly.

The motion detection section 56 compares between the difference in the detection region of the consecutive captured images and the detection thresholds, and detects that a moving object has entered the detection region based on the comparison results. The motion detection section 56 instructs depression of the shutter to the image capture control unit 51 (i.e. execution of photography) as a motion shutter function, when detecting that a moving object included in the captured images has entered the detection region.

More specifically, the motion detection section 56 determines whether the difference of the luminance component in the detection region of consecutive captured images is greater than the detection threshold set for the luminance component, in the case of the mode of motion detection being set to the first detection mode. Then, the motion detection section 56 determines that a moving object has entered the detection region, in the case of the difference of the luminance component in the detection region of the consecutive images being greater than the detection threshold set for the luminance component. On the other hand, the motion detection section 56 determines that a moving object has not entered the detection region in the case of the difference of the luminance component in the detection region of the consecutive captured images being no higher than the detection threshold set for the luminance component.

In addition, the motion detection section 56 determines whether the difference of the chrominance component in the detection region of consecutive captured images is greater than the detection threshold set for the chrominance component, in the case of the mode of motion detection being set to the second detection mode. Then, the motion detection section 56 determines that a moving object has entered the detection region in the case of the difference of the chrominance component in the detection region of consecutive captured images being greater than the detection threshold set for the chrominance component. On the other hand, the motion detection section 56 determines that a moving object has not entered the detection region in the case of the difference of the chrominance component in the detection region of the consecutive captured images being no higher than the detection threshold set for the chrominance component.

Furthermore, the motion detection section 56 determines whether the differences of each of the luminance component and chrominance component in the detection region of the consecutive captured images is greater than the detection thresholds set for the luminance component and chrominance component, respectively, in the case of the mode of motion detection being set to the third detection mode. Then, the motion detection section 56 determines that a moving object has entered the detection region, in the case of either of the differences of the luminance component and chrominance component in the detection region of the consecutive captured images being greater than the detection thresholds set for the luminance component and chrominance component, respectively. On the other hand, the motion detection section 56 determines that a moving object has not entered the detection region, in the case of neither of the differences of the luminance component and chrominance component in the detection region of the consecutive captured images being higher than the detection thresholds set for the luminance component and chrominance component, respectively.

Figure 4:
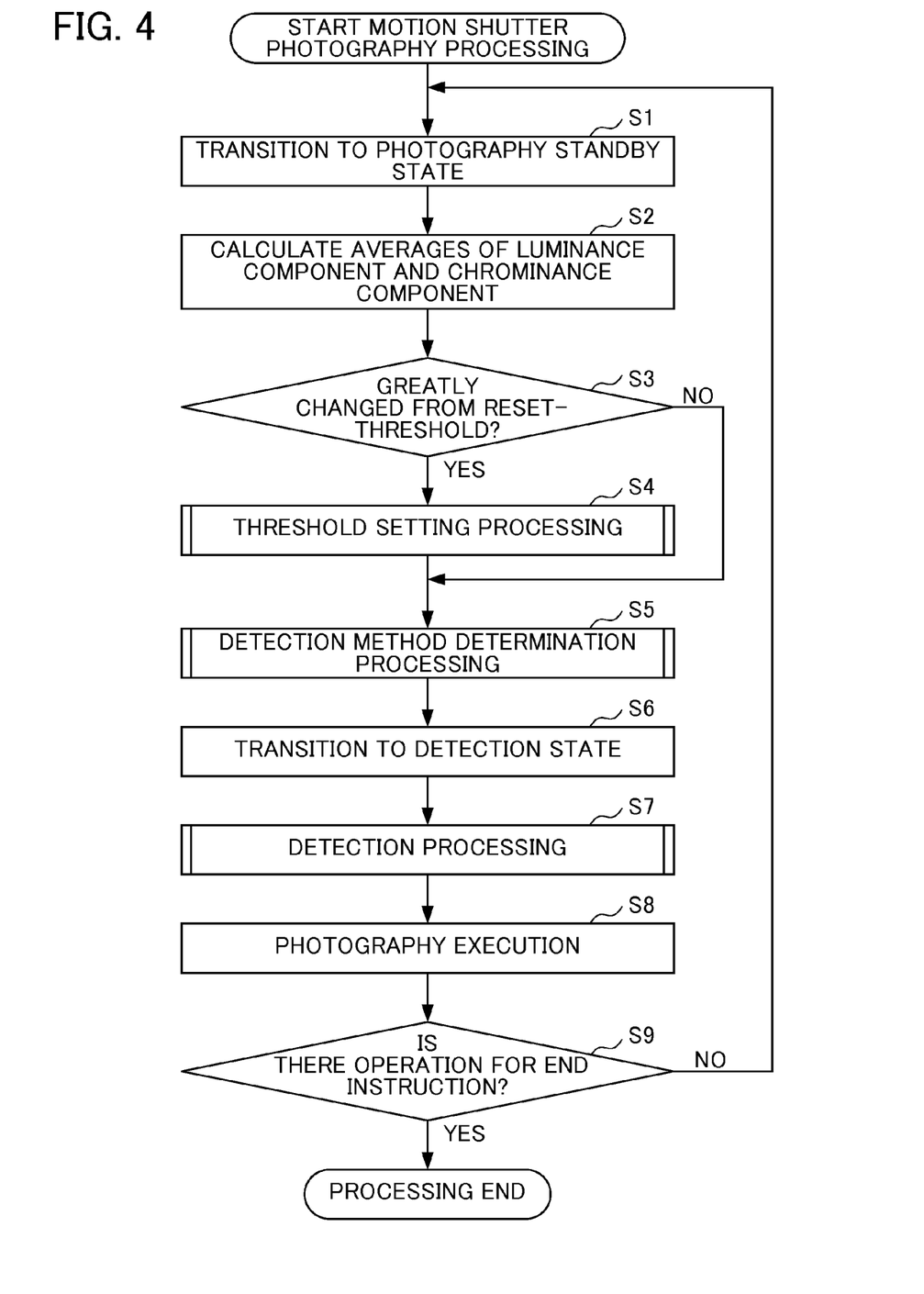
FIG. 4 is a flowchart showing the flow of motion shutter photography processing executed by the detection apparatus in FIG. 1 having the functional configuration of FIG. 2.

Next, operation will be explained. FIG. 4 is a flowchart showing the flow of motion shutter photography processing executed by the detection apparatus 1 in FIG. 1 having the functional configuration of FIG. 2.

The motion shutter photography processing is started to correspond with an operation instructing the start of the motion shutter photography processing being performed via the input unit 18.

In Step S1, the image capture control unit 51 advances to a photography standby state (state in which photography is executable by automatic depression of the shutter button). In the photography standby state, captured images are continuously acquired.

In Step S2, the average value calculation section 52 calculates the average values of the luminance component and chrominance component, for pixels of the overall captured image or within the detection region.

In Step S3, the threshold reset determination unit 53 performs determination of whether the average value of either of the luminance component and chrominance component of the pixels in the overall captured image calculated by the average value calculation section 52 have changed to be greater than the reset-thresholds of the luminance component and chrominance component, respectively.

In Step S3, in the case of determining that the average value of either of the luminance component and chrominance component of the pixels of the overall captured image has changed to be greater than the reset-thresholds of the luminance component and chrominance component, respectively (YES), the processing advances to Step S4.

On the other hand, in Step S3, in the case of determining that the average values of neither of the luminance component and chrominance component of the pixels of the overall captured image have changed to be greater than the reset-threshold of the luminance component and chrominance component, respectively (NO), the processing advances to Step S5.

In Step S4, the threshold setting unit 54 sets the detection threshold for performing motion detection, from the difference in the detection region of the two consecutive captured images, by executing the threshold setting processing described later.

In Step S5, the detection method determination section 55 compares between the determination thresholds set by the threshold setting unit 54 and the differences of the luminance component and chrominance component of the consecutive captured images, by executing the detection method determination processing described later.

In Step S6, the motion detection section 56 advances to a detection state that compares between the differences in the detection region of the consecutive captured images and the detection thresholds.

In Step S7, the motion detection section 56 performs motion detection of a subject by executing the detection processing described later.

In Step S8, the image capture control unit 51 executes image capture by depressing the shutter button automatically to correspond with the results of motion detection.

In Step S9, the image capture control unit 51 performs determination of whether an operation instructing the end of motion shutter photography processing has been performed via the input unit 18.

In Step S9, in the case of having determined that an operation instructing the end of motion shutter photography processing has been performed via the input unit 18 (YES), the processing comes to an end.

On the other hand, in Step S9, in the case of having determined that an operation instructing the end of motion shutter photography processing has not been performed via the input unit 18 (NO), the processing returns to Step S1 and continues the motion shutter photography processing.

Next, the threshold setting processing executed in Step S4 of the motion shutter photography processing will be explained.

Figure 5:
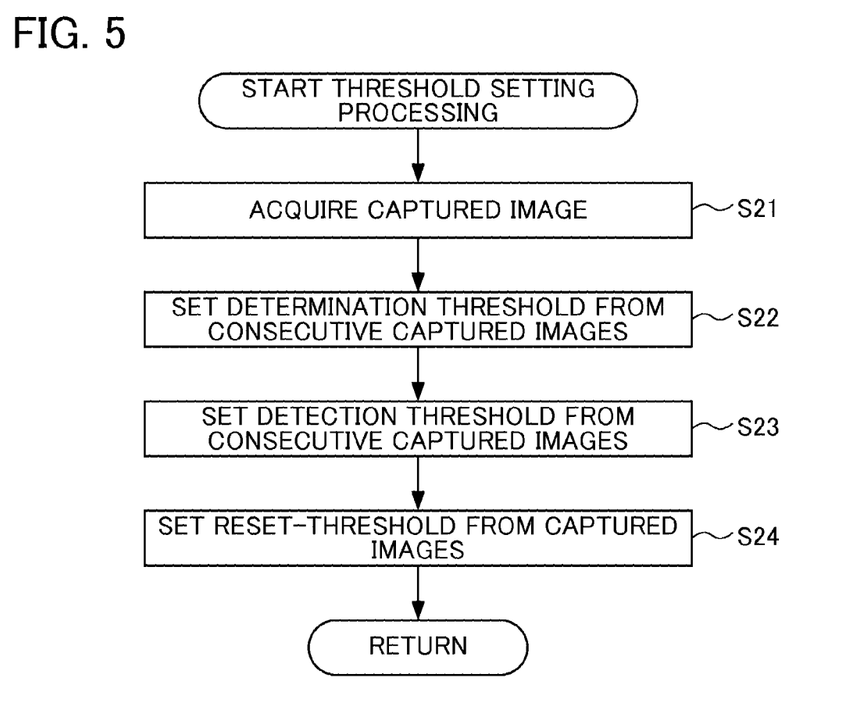
FIG. 5 is a flowchart showing the flow of threshold setting processing executed as a subflow of the motion shutter photography processing.

FIG. 5 is a flowchart showing the flow of threshold setting processing executed as a subflow of the motion shutter photography processing.

In Step S21, the threshold setting unit 54 acquires two consecutive captured images.

In Step S22, the threshold setting unit 54 sets the determination threshold for determining the mode of motion detection, from the difference in the detection region of the two consecutive captured images acquired.

In Step S23, the threshold setting unit 54 sets the detection threshold for performing motion detection from the difference in the detection region of the two consecutive captured images acquired. It should be noted that it may be configured so that the setting of the detection threshold in Step S23 is performed as a step in the detection method determination processing (step following Step S32 described later).

In Step S24, the threshold setting unit 54 sets the reset-threshold for determining whether resetting of the threshold value is necessary, based on the average values (average values of luminance component and chrominance component) of the two consecutive captured images acquired. It should be noted that, in Step S24, the average values of the luminance component and chrominance component of the overall captured images used in the setting of the reset-threshold are stored in the threshold storage section 71.

After Step S24, the processing returns to the motion shutter photography processing of FIG. 4.

It should be noted that, although the number of consecutive captured images used upon setting the determination thresholds and detection thresholds was set to 2 in the threshold setting processing, it may be configured to set the determination thresholds and detection thresholds from the difference in the detection region of three or more consecutive captured images. In this case, it is possible to set the respective upper thresholds and lower thresholds as the determination thresholds and detection thresholds, and perform determination providing hysteresis for the change direction of the differences in luminance component and chrominance component, upon the mode determination of motion detection and the determination of motion detection.

Next, the detection method determination processing executed in Step S5 of the motion shutter photography processing will be explained.

Figure 6:
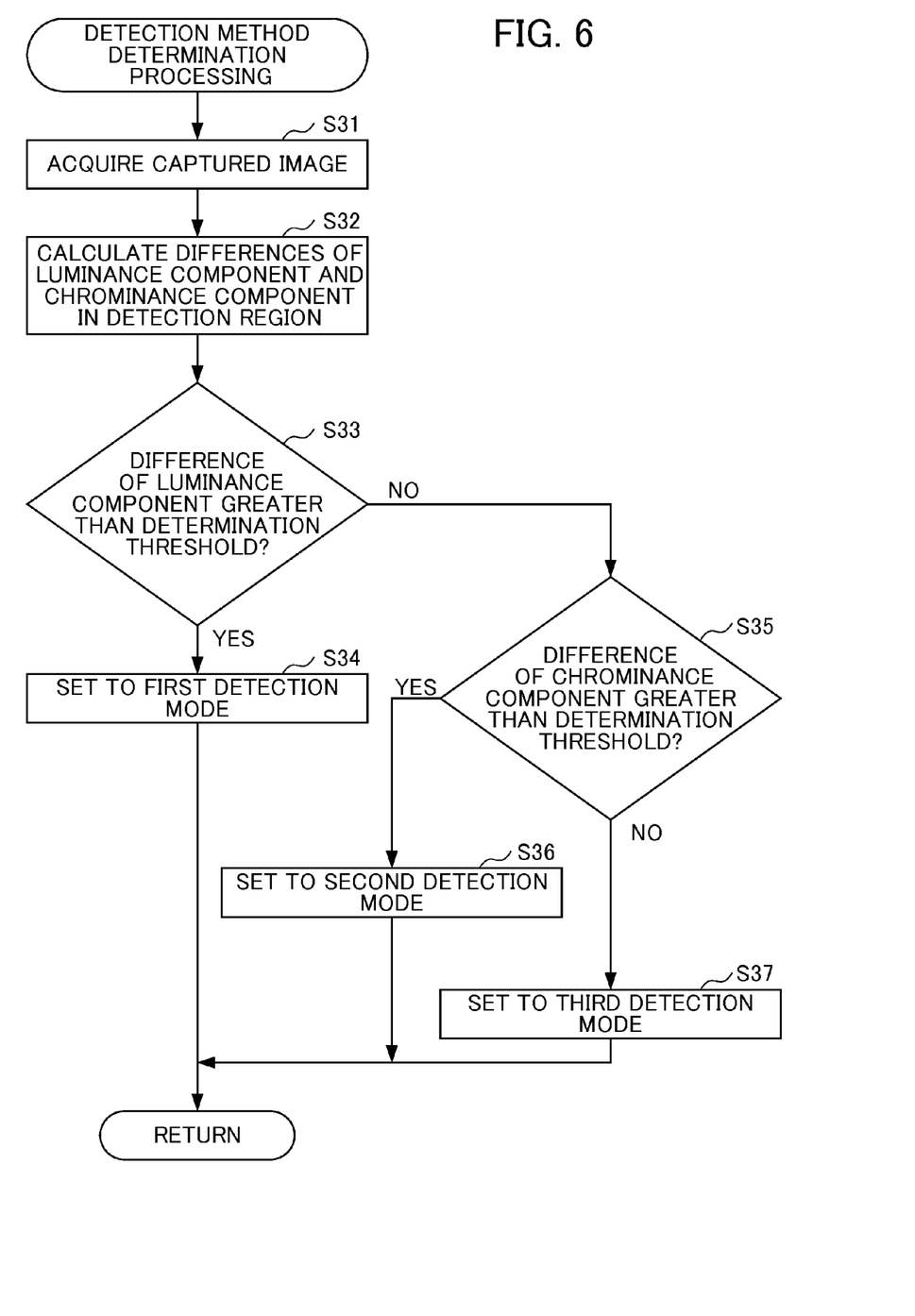
FIG. 6 is a flowchart showing the flow of detection method determination processing executed as a subflow of the motion shutter photography processing.

FIG. 6 is a flowchart showing the flow of detection method determination processing executed as a subflow of the motion shutter photography processing.

In Step S31, the detection method determination section 55 acquires two consecutive captured images.

In Step S32, the detection method determination section 55 calculates the differences of the luminance component and chrominance component in the detection region of the two consecutive captured images acquired.

In Step S33, the detection method determination section 55 performs determination of whether the difference of the luminance component in the detection region calculated is greater than the determination threshold set for the luminance component.

In Step S33, in the case of determining that the difference of the luminance component in the detection region calculated is greater than the determination threshold set for the luminance component (YES), the processing advances to Step S34.

On the other hand, in Step S33, in the case of determining that the difference of the luminance component in the detection region calculated is no higher than the determination threshold set for the luminance component (NO), the processing advances to Step S35.

In Step S34, the detection method determination section 55 establishes the mode of motion detection as the first detection mode, thereby establishing the setting to perform motion detection using the detection threshold for the luminance component.

In Step S35, the detection method determination section 55 performs determination of whether the difference of the chrominance component in the detection region calculated is greater than the determination threshold set for the chrominance component.

In Step S35, in the case of determining that the difference of the chrominance component in the detection region calculated is greater than the determination threshold set for the chrominance component (YES), the processing advances to Step S36.

On the other hand, in Step S35, in the case of determining that the difference of the chrominance component in the detection region calculated is no higher than the determination threshold set for the chrominance component (NO), the processing advances to Step S37.

In Step S36, the detection method determination section 55 establishes the mode of motion detection as the second detection mode, thereby establishing the setting to perform motion detection using the detection threshold of the chrominance component.

In Step S37, the detection method determination section 55 establishes the mode of motion detection as the third detection mode, thereby establishing the setting to perform motion detection using the detection thresholds of the luminance component and chrominance component.

After Step S34, Step S36 and Step S37, the processing returns to the motion shutter photography processing of FIG. 4.

Next, the detection processing executed in Step S7 of the motion shutter photography processing will be explained.

Figure 7:
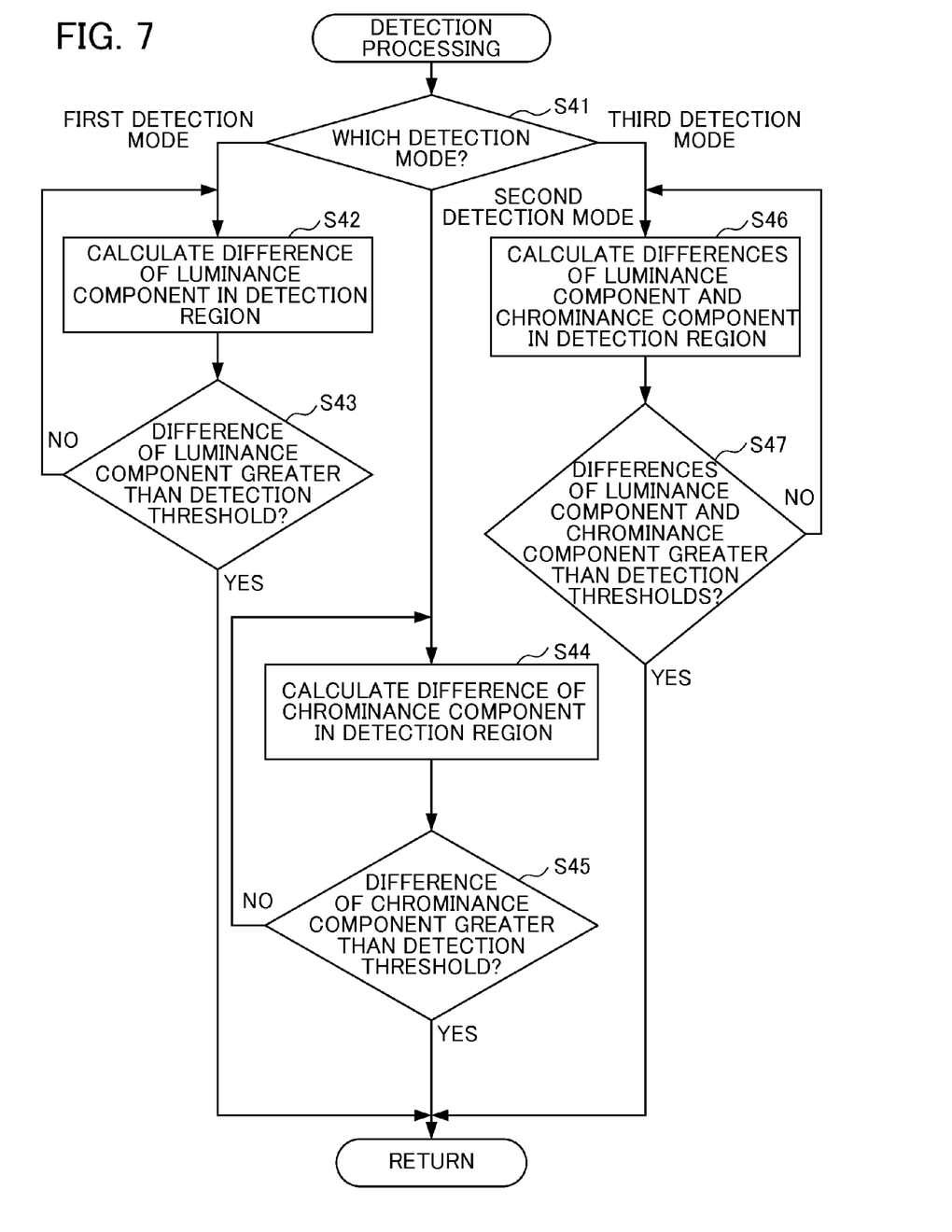
FIG. 7 is a flowchart showing the flow of detection processing executed as a subflow of the motion shutter photography processing.

FIG. 7 is a flowchart showing the flow of detection processing executed as a subflow of the motion shutter photography processing.

In Step S41, the motion detection section 56 performs determination of which mode the mode of motion detection is.

In Step S41, in the case of determining that the mode of motion detection is the first detection mode, the processing advances to Step S42.

In Step S41, in the case of determining that the mode of motion detection is the second detection mode, the processing advances to Step S44.

In Step S41, in the case of determining that the mode of motion detection is the third detection mode, the processing advances to Step S46.

In Step S42, the motion detection section 56 calculates the difference of the luminance component in the detection region of the consecutive captured images.

In Step S43, the motion detection section 56 performs determination of whether the difference of the luminance component in the detection region calculated is greater than the detection threshold set for the luminance component.

In Step S43, in the case of determining that the difference of the luminance component in the detection region calculated is greater than the detection threshold set for the luminance component (YES), the processing returns to the motion shutter photography processing of FIG. 4.

On the other hand, in Step S43, in the case of determining that the difference of the luminance component in the detection region calculated is no higher than the detection threshold set for the luminance component (NO), the processing advances to Step S42, and continues the detection processing.

In Step S44, the motion detection section 56 calculates the difference of the chrominance component in the detection regions of consecutive captured images.

In Step S45, the motion detection section 56 performs determination of whether the difference of the chrominance component in the detection region calculated is greater than the detection threshold set for the chrominance component.

In Step S45, in the case of determining that the difference of the chrominance component in the detection region calculated is greater than the detection threshold set for the chrominance component (YES), the processing returns to the motion shutter photography processing of FIG. 4.

On the other hand, in Step S45, in the case of determining that the difference of the chrominance component in the detection region calculated is no higher than the detection threshold set for the chrominance component (NO), the processing advances to Step S44, and continues the detection processing.

In Step S46, the motion detection section 56 calculates the differences of the luminance component and chrominance component in the detection region of the consecutive captured images.

In Step S47, the motion detection section 56 performs determination of whether either of the luminance component and the chrominance component in the detection region calculated is greater than the detection thresholds set for the luminance component and chrominance component, respectively.

In Step S47, in the case of determining that either of the differences of the luminance component and the chrominance component in the detection region calculated is greater than the detection thresholds set for the luminance component and chrominance component, respectively (YES), the processing returns to the motion shutter photography processing of FIG. 4.

On the other hand, in Step S47, in the case of determining that neither of the differences of the luminance component and chrominance component in the detection region calculated are higher than the detection thresholds set for the luminance component and chrominance component, respectively (NO), the processing advances to Step S46, and continues the detection processing.

The detection apparatus 1 configured in the above way includes the average value calculation section 52, detection method determination section 55 and motion detection section 56.

The average value calculation section 52 acquires luminance information and color information, from the captured images continuously captured in frame as a unit by the image capture unit 16.

The detection method determination section 55 determines either one or both among the luminance information and color information to use in order to detect movement of a predetermined object, based on the luminance information and color information thus acquired.

The motion detection section 56 detects movement of the predetermined object using either among the luminance information and color information, based on the results determined.

It is thereby possible for the detection apparatus 1 to determine which of either the luminance component and chrominance component of captured images to use to detect movement of an object.

Therefore, it becomes possible to detect movement of an object more appropriate in captured images.

In addition, the detection apparatus 1 further includes the threshold setting section 54.

The threshold setting section 54 sets the determination threshold to be used in comparison with the difference of the luminance information between a plurality of consecutive frames, and a determination threshold to be used in comparison with the difference of the color information between a plurality of consecutive frames.

The detection method determination section 55 determines either one or both among the luminance information and color information to use in order to detect movement of the predetermined object, from the determination threshold of the luminance information and the determination threshold of the color information that have been set, and the difference of the luminance information and the difference of color information that are acquired.

It is thereby possible to determine either one or both among the luminance information and color information to use, by setting appropriate determination thresholds for each of the luminance information and color information.

In addition, the average value calculation section 52 acquires, as the luminance information, a value of the luminance component for each of the pixels in the captured image as the luminance value, and acquires, as the color information, a value calculated from the values of the chrominance component for each of the pixels as the hue value.

The threshold setting section 54 sets, as the determination threshold of the luminance information, a value that is larger than the difference of the luminance value for each pixel between a plurality of consecutive captured images, and sets, as the determination threshold of the color information, a value that is larger than the difference of the hue value for each pixel.

It is thereby possible to set appropriate determination thresholds from the luminance value and chrominance component of captured images.

In addition, the detection method determination section 55 determines to use the color information (hue value) in the detection of the predetermined object, in the case of the difference of the luminance value for each of the pixels between a plurality of consecutive captured images after setting by the threshold setting section 54 being no higher than the determination threshold of the luminance information set.

It thereby becomes possible, for example, to more appropriately detect movement of an object, even in a case of performing detection of movement of the object in captured images for which the difference in luminance information is difficult to express, such as a case of the background being a wall without texture, and detecting a sheet of copy paper as the moving object.

In addition, the detection method determination section 55 determines to use the luminance information (luminance value) in the detection of a predetermined object, in the case of the difference of the color information (hue value) for every pixel between a plurality of consecutive captured images after setting by the threshold setting section 54 being no higher than the determination threshold of the color information set.

It thereby becomes possible to more appropriately detect a moving object, even in a case of performing detection of movement of an object in captured images for which the difference in color information is difficult to express, such as a case of the background being a wall nearly flesh colored, and detecting the hand of a person as the moving object.

In addition, the detection method determination section 55 further determines to use both the luminance information and color information, in the case of the difference of the luminance value for every pixel between a plurality of consecutive captured images after setting by the threshold setting section 54 being no higher than the determination threshold of the luminance information set, and the difference of the color information (hue value) for every pixel between a plurality of consecutive captured images after setting by the threshold setting section 54 being no higher than the determination threshold of the color information set.

The motion detection section 56 detects movement of the predetermined object using both among the luminance information and color information, in the case of determining to use both as the determination result.

It thereby becomes possible, for example, to more appropriately detect movement of an object, even in a case of performing detection of movement of the object in captured images in which the difference in either of luminance information and color information is difficult to clearly express.

In addition, the threshold setting section 54 sets a detection threshold of luminance information that is greater than the determination threshold of luminance information, and sets a detection threshold of color information that is greater than the determination threshold of color information.

The motion detection section 56 detects movement of the predetermined object using either of the detection threshold of luminance information and the detection threshold of color information that have been set.

It is thereby possible to perform detection of movement of an object, by setting a determination threshold and detection threshold of appropriate sizes for the luminance information and color information, respectively.

The average value calculation section 52 acquires, as the luminance information, a value of the luminance component for every pixel of the captured image as the luminance value, and acquires, as the color information, a value calculated from the value of the chrominance component for every pixel as the hue value.

The threshold setting section 54 sets, as the detection threshold of the luminance information, a value that is larger than the difference of the luminance value for every pixel between a plurality consecutive captured images, and sets, as the detection threshold of the color information, a value that is larger than the difference of the hue value for every pixel.

It is thereby possible to set appropriate detection thresholds from the luminance value and chrominance component of captured images.

The motion detection section 56 detects movement of a predetermined object based on either a size relationship between the detection threshold of the luminance information set and the difference of luminance values for every pixel acquired between a plurality of consecutive captured images after setting by the threshold setting section 54; and a size relationship between the detection threshold of the color information set and the difference of hue values for every pixel acquired between a plurality of consecutive captured images.

It is thereby possible to perform detection of movement of an object according to detection thresholds of appropriate size, for the luminance information and color information, respectively.

In addition, the detection apparatus 1 includes the input unit 18.

According to a user operation, the input unit 18 changes the detection thresholds of the luminance information and the detection threshold of the color information set.

It thereby becomes possible to change the detection threshold of the luminance information and the detection threshold of the color information in response to the request of a user.

In addition, the average value calculation section 52 acquires luminance information and color information within the detection region in the captured images.

The detection method determination section 55 performs determination with the luminance information and color information acquired within the detection region in the captured images.

The motion detection section 56 performs detection of movement of a predetermined object within the detection region in the captured images.

It thereby becomes possible to set the detection region in the captured images, and perform detection of movement of an object with the detection region as a target.

In addition, the detection apparatus 1 includes the average value calculation section 52, threshold reset determination section 53, threshold setting section 54 and motion detection section 56.

The average value calculation section 52 acquires luminance information related to luminance, from the captured images continuously captured in frame as a unit by the image capture unit 16.

The threshold setting section 54 sets the luminance information detection threshold.

The motion detection section 56 detects movement of a predetermined object using the detection threshold of luminance information set and the luminance information acquired.

The threshold reset determination section 53 causes reset of the detection threshold of luminance information to be executed in the threshold setting section 54, in the case of satisfying a predetermined condition.

It is thereby possible to reset the detection threshold of luminance information according to the predetermined conditions, in the case of performing detection of movement of an object using the detection threshold of luminance information.

Therefore, it becomes possible to perform detection of movement of an object using a more appropriate detection threshold of luminance information.

In addition, the average value calculation section 52 further acquires color information related to colors as a photographing condition, from captured images continuously captured in frame as a unit.

The threshold setting section 54 further sets the detection threshold of color information.

The motion detection section 56 further detects movement of a predetermined object using the detection threshold of color information set and the color information acquired.

The threshold reset determination section 53 further causes reset of the detection threshold of color information to be executed in the threshold setting section 54, in the case of satisfying a predetermined condition.

It is thereby possible to reset the detection threshold of color information according to the predetermined condition, in the case of performing detection of movement of an object using the detection threshold of color information.

Therefore, it becomes possible to perform detection of movement of an object using a more appropriate detection threshold of color information.

In addition, the detection apparatus 1 further includes the threshold storage section 71.

The threshold storage section 71 stores photographing conditions acquired at the time of setting by the threshold setting section 54.

The predetermined condition is a case of the difference between the photographing conditions stored and the photographing conditions acquired during photography standby exceeding a predetermined range.

It thereby becomes possible to detect the change in photographing conditions, and perform reset of the detection threshold of luminance information.

In addition, the predetermined condition is a case of transitioning to the photography standby state.

It thereby becomes possible to perform reset of the detection threshold of luminance information in the case of entering the photography standby state.

In addition, the predetermined condition is a case of an execution instruction for reset being performed according to a user operation.

It thereby becomes possible to perform reset of the detection threshold of luminance information in response to the request of a user.

In addition, the detection apparatus 1 further includes the image capture control section 51.

The image capture control section 51 executes a predetermined operation upon movement of a predetermined object being detected.

It thereby becomes possible to cause a predetermined operation to be executed in the detection apparatus 1 to correspond to the movement of an object being detected in captured images.

In addition, the predetermined moving object is a part of a person.

The predetermined operation is a photographing operation to acquire captured images and perform predetermined photography processing.

It thereby becomes possible to cause predetermined photography processing to be performed in the detection apparatus 1 to correspond with a part of a person being detected as the moving object in captured images.

It should be noted that the present invention is not to be limited to the aforementioned embodiment, and that modifications, improvements, etc. within a scope that can achieve the object of the present invention are included in the present invention.

For example, in the aforementioned embodiment, the luminance information and color information (e.g., luminance value, hue value, etc. of flesh color representing the hand of a person) of the object being assumed as the moving object may be set in advance, and the thresholds for the luminance information and color information may be set based on the luminance information and color information of this object and the difference in the detection region of captured images. For example, for the luminance component and chrominance component, respectively, it is possible to set the determination threshold (e.g., 120% of difference) and detection threshold (e.g., 150% of difference) to values of predetermined percentages larger than the differences between the captured images and the luminance value and hue value of the object being assumed as the moving object.

In addition, in the aforementioned embodiment, the chrominance of captured images may be converted to hue value by way of color space conversion. Furthermore, based on the converted hue value, motion detection may be performed by setting the determination threshold, detection threshold or reset-threshold of the hue value.

Moreover, in the aforementioned embodiment, it may be configured so that the user changes the determination thresholds and detection thresholds for the luminance information and color information, respectively, via the input unit 18.

Additionally, in the aforementioned embodiment, it may be configured so that the user causes the detection thresholds and determination thresholds for the luminance information and color information, respectively, to be reset in the threshold setting section 54 via the input unit 18.

Furthermore, in the aforementioned embodiment, it may cause the detection thresholds and determination thresholds for the luminance information and color information, respectively, to be reset in the threshold setting section 54, every time the photography standby state is entered and the input of consecutive captured images is begun.

Moreover, in the aforementioned embodiment, although an explanation was made by giving an example of a case of setting the detection region to a partial region in a captured image, it may be configured to set the detection region to the entirety of the captured image.

In addition, it may be configured so as to set the detection region to a plurality of locations in the captured image, in the case of setting the detection region to a partial region of the captured image.

Furthermore, in the aforementioned embodiment, although an explanation is made giving an example of a case of applying the present invention to the motion shutter function, it is not limited thereto. In other words, as a result of motion detection, it may be configured so as to transition to a state of playing back the captured images. In addition, it is possible to apply the present invention to a case of detecting a moving object such as a vehicle or animal in captured images. Furthermore, as a result of motion detection, it may be configured to perform various predetermined operations (e.g., activation of a predetermined application, illuminating of a light, opening/closing of a gate, etc.), not limiting to a case of depressing the shutter.

Additionally, in the aforementioned embodiment, although the detection apparatus 1 to which the present invention is applied is explained with the example of a digital camera, it is not particularly limited thereto.

For example, the present invention can be applied to common electronic devices having a motion shutter function. More specifically, for example, the present invention is applicable to notebook personal computers, video cameras, portable navigation devices, portable telephones, smartphones, handheld game consoles, etc.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the detection apparatus 1 can be provided with the functions enabling the aforementioned processing sequence to be executed in its entirety.

In addition, a single functional block may be configured by a single piece of hardware, may be configured by a single installation of software, or may be configured by any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program not only can be constituted by the removable medium 31 shown in FIG. 1 distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magneto optical disk, or the like. The optical disk is composed of, for example, a CD-ROM (Compact Disk-Read Only Memory), a DVD (Digital Versatile Disk), a Blu-ray (registered trademark) disk (Blu-ray Disk) or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplifications, and are not to limit the technical scope of the present invention. Various other embodiments can be employed for the present invention, and various modifications such as omissions and replacements are possible without departing from the spirit of the present invention. Such embodiments and modifications are included in the scope of the invention and the summary described in the present specification, and are included in the invention recited in the claims as well as the equivalent scope thereof.

What is claimed is:

1. A detection apparatus for detecting movement of a predetermined object from captured images, the apparatus comprising:
    an acquisition section that acquires luminance information and color information, from the captured images continuously captured in frames by an image capture section;
    a determination section that determines whether to use either one or both among the luminance information and the color information in order to detect movement of the predetermined object, based on the luminance information and the color information acquired;
    a detection section that detects movement of the predetermined object using either one or both among the luminance information and the color information, based on a result of determination by the determination section; and
    a determination threshold setting section that sets a determination luminance threshold to be used in comparison with a difference in the luminance information between a plurality of consecutive frames, and a determination color threshold to be used in comparison with a difference in the color information between a plurality of consecutive frames,
    wherein the determination section determines whether to use either one or both among the luminance information and the color information in order to detect movement of the predetermined object based on the determination luminance threshold and the determination color threshold that have been set, and based on a difference of the luminance information and a difference of the color information that are acquired.

2. The detection apparatus according to claim 1,
    wherein the acquisition section acquires, as the luminance information, a luminance value that is a value of the luminance component for each pixel of the captured image, and acquires, as the color information, a hue value that is a value calculated from a value of the chrominance component for each of the pixels,
    wherein the determination threshold setting section sets, as the determination luminance threshold, a value greater than the difference of the luminance value of each of the pixels between the plurality of consecutive frames, and sets, as the determination color threshold, a value greater than the difference of the hue value for each of the pixels between the plurality of consecutive frames, and
    wherein the determination section determines to use the hue value in a case of the difference of the luminance value for each of the pixels between the plurality of consecutive frames after setting by the determination threshold setting section being no higher than the determination luminance threshold set.

3. The detection apparatus according to claim 1,
    wherein the acquisition section acquires, as the luminance information, a luminance value that is a value of the luminance component for each pixel of the captured image, and acquires, as the color information, a hue value that is a value calculated from a value of the chrominance component for each of the pixels,
    wherein the determination threshold setting section sets, as the determination luminance threshold, a value greater than the difference of the luminance value of each of the pixels between the plurality of consecutive frames, and sets, as the determination color threshold, a value greater than the difference of the hue value for each of the pixels between the plurality of consecutive frames, and
    wherein the determination section determines to use the luminance value in a case of the difference of the hue value for each of the pixels between the plurality of consecutive frames after setting by the determination threshold setting section being no higher than the determination color threshold set.

4. The detection apparatus according to claim 2,
    wherein the determination section further determines to use both of the luminance information and the color information in a case of the difference of the luminance value for each of the pixels between the plurality of consecutive frames after setting by the determination threshold setting section being no higher than the determination luminance threshold set, and the difference of the hue value for each of the pixels between the plurality of consecutive frames after setting by the determination threshold setting section being no higher than the determination color threshold set, and
    wherein the detection section detects movement of the predetermined object using both among the luminance information and the color information, in a case of determining to use both as a determination result.

5. The detection apparatus according to claim 1,
    wherein the acquisition section acquires, as the luminance information, a luminance value that is a value of the luminance component for each pixel of the captured image, and acquires, as the color information, a hue value that is a value calculated from a value of the chrominance component for each of the pixels,
    the detection apparatus further comprising:
    a detection threshold setting section that sets a detection luminance threshold that sets, as a detection luminance threshold, a value greater by a predetermined ratio than a difference of the luminance value for each pixel between a plurality of consecutive frames and greater than the determination luminance threshold, and sets, as a detection color threshold, a value greater by a predetermined ratio than a difference of the hue value for each pixel between a plurality of consecutive frames and greater than the determination color threshold,
    wherein the detection section detects movement of the predetermined object using either one or both among the detection luminance threshold and the detection color threshold set.

6. The detection apparatus according to claim 5, wherein the detection section detects movement of the predetermined object based on either: a size relationship between the detection luminance threshold that was set and a difference of luminance value for each of the pixels acquired between a plurality of consecutive frames after setting by the detection threshold setting section; or a size relationship between the detection color threshold that was set and a difference of hue value for each of the pixels acquired between a plurality of consecutive frames after setting by the detection threshold setting section.

7. The detection apparatus according to claim 1, further comprising an operation section that executes a predetermined operation in a case of movement of the predetermined object being detected.

8. A detection method to be executed by a detection apparatus for detecting movement of a predetermined object from captured images, the method comprising:

acquiring luminance information and color information, from the captured images continuously captured in frames by an image capture section;

determining whether to use either one or both among the luminance information and the color information in order to detect movement of the predetermined object, based on the luminance information and the color information acquired;

detecting movement of the predetermined object using either one or both among the luminance information and the color information, based on a result of the determining; and setting a determination luminance threshold to be used in comparison with a difference in the luminance information between a plurality of consecutive frames, and a determination color threshold to be used in comparison with a difference in the color information between a plurality of consecutive frames, wherein, in the step of determining, it is determined whether to use either one or both among the luminance information and the color information in order to detect movement of the predetermined object, based on the determination luminance threshold and the determination color threshold that have been set, and based on the difference of the luminance information and the difference of the color information that are acquired.

9. A computer readable non-transitory storage medium that is encoded with a program for enabling a computer that controls a detection apparatus for detecting movement of a predetermined object from captured images to realize:

an acquisition function of acquiring luminance information and color information, from the captured images continuously captured in frames by an image capture section;

a determination function of determining whether to use either one or both among the luminance information and the color information in order to detect movement of the predetermined object, based on the luminance information and the color information acquired;

a detection function of detecting movement of the predetermined object using either one or both among the luminance information and the color information, based on a result determined by the determination function; and a setting function of setting a determination luminance threshold to be used in comparison with a difference in the luminance information between a plurality of consecutive frames, and a determination color threshold to be used in comparison with a difference in the color information between a plurality of consecutive frames, wherein it is determined by the determination function whether to use either one or both among the luminance information and the color information in order to detect movement of the predetermined object, based on the determination luminance threshold and the determination color threshold that have been set, and based on the difference of the luminance information and the difference of the color information that are acquired.

10. The detection apparatus according to claim 7, wherein movement of the predetermined object is related to a part of a person, and wherein the predetermined operation is a photographing operation to acquire captured images and perform predetermined photography processing.

* * * * *